(12) United States Patent
Taguchi et al.

(10) Patent No.: US 9,759,295 B2
(45) Date of Patent: Sep. 12, 2017

(54) SINGLE AXIS ACTUATOR

(71) Applicant: NSK Ltd., Shinagawa-ku, Tokyo (JP)

(72) Inventors: Toshifumi Taguchi, Kanagawa (JP); Shigeru Endou, Kanagawa (JP)

(73) Assignee: NSK Ltd., Tokyo (JP)

( * ) Notice: Subject to any disclaimer, the term of this patent is extended or adjusted under 35 U.S.C. 154(b) by 4 days.

(21) Appl. No.: 15/026,077

(22) PCT Filed: Dec. 26, 2014

(86) PCT No.: PCT/JP2014/006500
§ 371 (c)(1),
(2) Date: Mar. 30, 2016

(87) PCT Pub. No.: WO2015/098123
PCT Pub. Date: Jul. 2, 2015

(65) Prior Publication Data
US 2016/0245378 A1    Aug. 25, 2016

(30) Foreign Application Priority Data

Dec. 27, 2013    (JP) .................. 2013-273044

(51) Int. Cl.
*F16H 27/02*    (2006.01)
*F16H 19/06*    (2006.01)
*H02K 7/06*    (2006.01)

(52) U.S. Cl.
CPC ......... *F16H 19/06* (2013.01); *F16H 19/0622* (2013.01); *F16H 19/0672* (2013.01); *H02K 7/06* (2013.01); *F16H 2019/0686* (2013.01)

(58) Field of Classification Search
CPC .... F16H 19/06; F16H 2019/0686; H02K 7/06
See application file for complete search history.

(56) References Cited

U.S. PATENT DOCUMENTS

| | | | |
|---|---|---|---|
| 2012/0044709 A1* | 2/2012 | Wille | B60Q 1/076 362/467 |
| 2013/0112104 A1* | 5/2013 | Tamai | B61F 5/245 105/199.2 |
| 2013/0150193 A1* | 6/2013 | Fukano | F16H 7/18 474/148 |

FOREIGN PATENT DOCUMENTS

| | | |
|---|---|---|
| JP | 2006-43856 A | 2/2006 |
| JP | 2006-83942 A | 3/2006 |

(Continued)

OTHER PUBLICATIONS

International Preliminary Report on Patentability (PCT/IB/338 & PCT/IB/373) issued in PCT Application No. PCT/JP2014/006500 dated Jul. 7, 2016, including English translation of document C2 (Japanese-language Written Opinion (PCT/ISA/237)) previously filed on Mar. 30, 2016 (eight pages).

(Continued)

*Primary Examiner* — Zakaria Elahmadi
(74) *Attorney, Agent, or Firm* — Crowell Moring LLP

(57) ABSTRACT

A single axis actuator includes a driving-side timing pulley located at one end in a longitudinal direction of a device frame in such a manner that a rotational center thereof is vertically oriented, a rotation transmission shaft coaxially connected to the driving-side timing pulley and extending upwardly, a driven-side timing pulley located at another end in the longitudinal direction of the device frame in such a manner that a rotation shaft thereof is vertically oriented, a timing belt bridged between the driving-side and driven-side timing pulleys, a slider connected to a part of the timing belt to be made movable in the longitudinal direction of the device frame, and a motor having a motor shaft that is connected to an upper end of the rotation transmission shaft.

4 Claims, 3 Drawing Sheets

(56) References Cited

FOREIGN PATENT DOCUMENTS

| JP | 2012-149691 A | 8/2012 |
| JP | 2013-119917 A | 6/2013 |

OTHER PUBLICATIONS

International Search Report (PCT/ISA/210) issued in PCT Application No. PCT/JP2014/006500 dated Mar. 31, 2015 with English translation (three pages).
Japanese-language Written Opinion (PCT/ISA/237) issued in PCT Application No. PCT/JP2014/006500 dated Mar. 31, 2015 (five pages).

\* cited by examiner

SINGLE AXIS ACTUATOR

TECHNICAL FIELD

The present invention relates to a single axis actuator.

BACKGROUND ART

For example, there is known a waterproof structure of a linear motion mechanism described in PTL 1.

The waterproof structure of PTL 1 is configured to ensure sealability in such a way that an opening portion for water to enter is closed with two pieces of sealing members, a wedge portion provided on a slider is located between the two pieces of sealing members, and the wedge portion contacts with the two pieces of sealing members along with linear movement of the slider.

CITATION LIST

Patent Literature

PTL 1: JP 2006-43856 A

SUMMARY OF INVENTION

Technical Problems

Meanwhile, although the waterproof structure of PTL 1 can increase sealability when the wedge portion is formed to be thin, a single axis actuator whose slider is provided with a thin wedge portion has problems in terms of load resistance and moment resistance in the directions of pitching, yawing, and rolling, and therefore cannot be of high load specifications.

The present invention has been made in view of the unsolved problems of the above conventional example, and furthermore, it is an object of the invention to provide a single axis actuator that can be used as being of high load specifications even in an environment in which a slider is submerged in water.

Solution to Problems

In order to achieve the object mentioned above, according to an aspect of the present invention, there is provided a single axis actuator including: a driving-side timing pulley located at one end in a longitudinal direction of a device frame in such a manner that a rotational center of the driving-side timing pulley is vertically oriented; a rotation transmission shaft coaxially connected to the driving-side timing pulley and extending upwardly; a driven-side timing pulley located at another end of the longitudinal direction of the device frame in such a manner that a rotation shaft of the driven-side timing pulley is vertically oriented; a timing belt bridged between the driving-side timing pulley and the driven-side timing pulley; a slider connected to a part of the timing belt to be made movable in the longitudinal direction of the device frame; and a motor having a motor shaft which is connected to an upper end of the rotation transmission shaft.

In addition, this single axis actuator may include a cylindrical housing that houses the rotation transmission shaft and the motor shaft and a pulley case that houses the driving-side timing pulley. The rotation transmission shaft may pass through a lower opening portion provided at a lower portion of the housing and an upper opening portion provided at an upper portion of the pulley case to be connected to the driving-side timing pulley. A first liquid-tight sealing member may be located on a peripheral edge between the lower opening portion of the housing and the upper opening portion of the pulley case, the lower opening portion and the upper opening portion corresponding to each other.

In addition, in this single axis actuator, the motor may be located at an upper portion of the housing, and a second liquid-tight sealing member may be located between the motor and a peripheral edge of an upper opening portion of the housing, the motor shaft extending from above the upper opening portion.

Furthermore, the driving-side timing pulley, the rotation transmission shaft, the driven-side timing pulley, the timing belt, and the slider may be made of a material having corrosion resistance against moisture.

Advantageous Effects of Invention

According to an embodiment of the present invention, when the single axis actuator of the embodiment is placed in a state where the slider is submerged in water, the motor located on the upper portion of the rotation transmission shaft is positioned above a water level. Thus, a waterproof effect can be sufficiently ensured even without providing any specific waterproof structure to the motor. In addition, the embodiment does not include any sealing structure that affects load resistance, moment resistance, and the like of the single axis actuator, and thus can be used as a single axis actuator of high load specifications.

DESCRIPTION OF EMBODIMENTS

Hereinafter, modes for carrying out the present invention (hereinafter referred to as "embodiments") will be described in detail with reference to the drawings.

Figure 1:
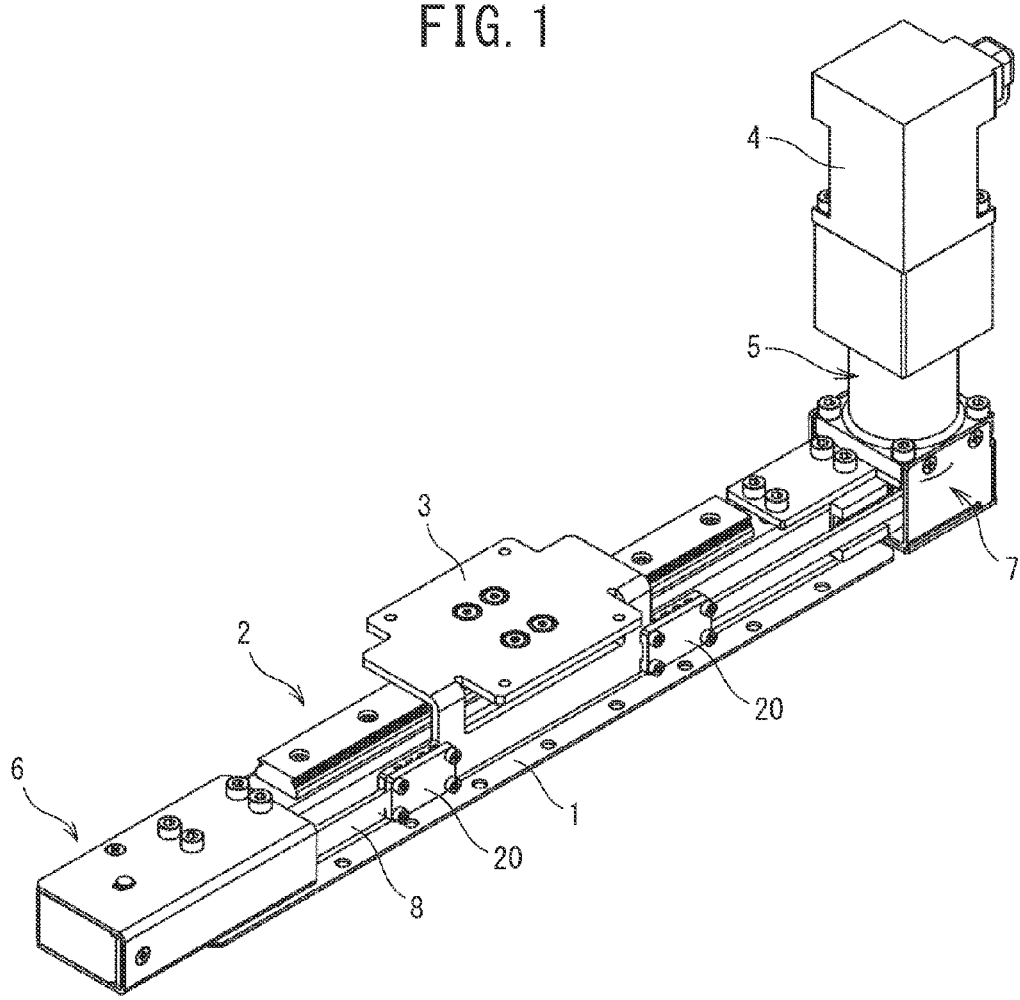
FIG. 1 is a perspective view illustrative of a single axis actuator of an embodiment according to the present invention.

FIG. 1 illustrates an appearance of a single axis actuator of an embodiment according to the present invention.

The single axis actuator of the present embodiment includes a device frame 1, a timing belt mechanism 2 located on the device frame 1, a slider 3 secured to a timing belt 8 of the timing belt mechanism 2, a motor 4, and a rotation transmission unit 5 connected to a lower portion of the motor 4 to transmit a driving power of the motor 4 to the timing belt mechanism 2.

Figure 2:
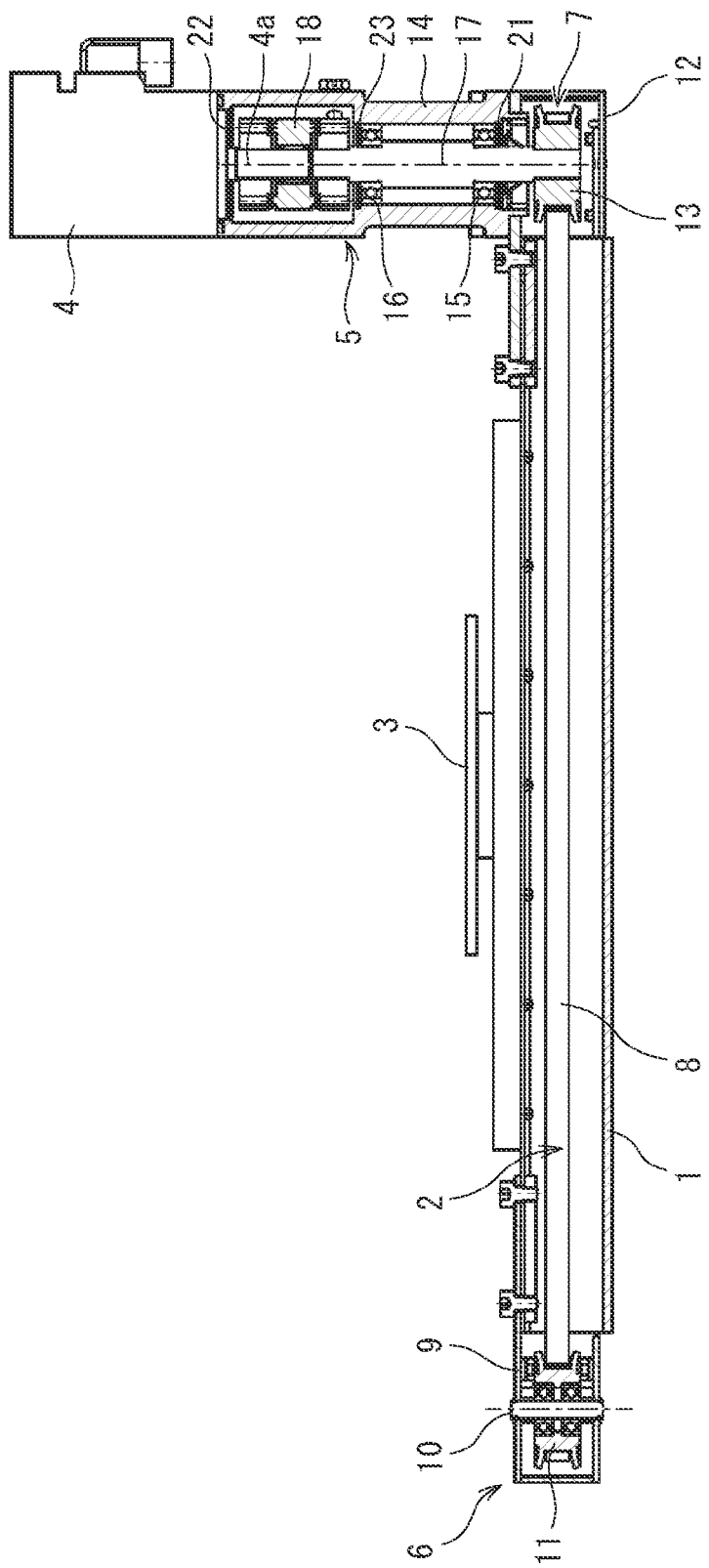
FIG. 2 is a sectional view of a main part illustrative of a structure of the single axis actuator of the embodiment according to the invention.

The timing belt mechanism 2 includes, as illustrated in FIG. 2, a driven-side pulley unit 6 located on one side in a longitudinal direction of the device frame 1, a driving-side pulley unit 7 located on an other side in the longitudinal direction of the device frame 1, and the timing belt 8 located between the driven-side pulley unit 6 and the driving-side pulley unit 7.

The driven-side pulley unit 6 includes a pulley case 9 secured to one end of the device frame 1, a shaft 10 secured to the pulley case 9 in such a manner that a shaft line thereof vertically extends, and a driven-side timing pulley 11 rotatably located at the shaft 10.

The driving-side pulley unit 7 includes a pulley case 12 secured to another end of the device frame 1 and a driving-side timing pulley 13 located inside the pulley case 12 in such a manner that a rotational center of the pulley 13 is vertically oriented.

The rotation transmission unit 5 includes a cylindrical housing 14 located on an upper portion of the pulley case 12 of the driving-side pulley unit 7, a rotation transmission shaft 17 supported rotatably by bearings 15, 16 located inside the housing 14 and protruded from a lower opening portion of the housing 14 to be connected to the driving-side timing pulley 13 of the driving-side pulley unit 7, and a coupling member 18 that coaxially connects a motor shaft 4*a* of the motor 4 inserted into the housing from an upper opening portion of the housing 14 and the rotation transmission shaft 17.

Then, as illustrated in FIG. 1, the timing belt 8 is bridged between the driven-side timing pulley 11 of the driven-side pulley unit 6 and the driving-side timing pulley 13 of the driving-side pulley unit 7 in a state where a width direction of the belt is vertically oriented, and the slider 3 is secured to the timing belt 8 via a slider securing member 20.

As illustrated in FIG. 2, a first liquid-tight sealing member 21 is mounted on a peripheral edge between the lower opening portion formed at a lower portion of the housing 14 and an upper opening portion formed on the upper portion of the pulley case 12 of the driving-side pulley unit 7, the lower opening portion and the upper opening portion corresponding to each other.

In addition, a second liquid-tight sealing member 22 is mounted between a peripheral edge of the upper opening portion formed on the upper portion of the housing 14 and an end face of the motor 4 on a side where the motor shaft 4*a* is protruding.

Furthermore, a third liquid-tight sealing member 23 is also mounted on an upper portion of the bearing 16 rotatably supporting the rotation transmission shaft 17 of the housing 14.

In addition, the driven-side timing pulley 11 and the driving-side timing pulley 13 are made of a synthetic resin material having corrosion resistance against moisture. Additionally, the device frame 1, the slider 3, the pulley case 9 of the driven-side pulley 6, the shaft 10, the pulley case 12 of the driving-side pulley unit 7, the rotation transmission shaft 17, and the housing 14 are made of a metal material having corrosion resistance against moisture, such as stainless steel.

In the single axis actuator of the present embodiment, by performing forward and reverse rotation operations of the motor 4, rotation of the motor shaft 4*a* is transmitted to the driving-side timing pulley 13 of the driving-side pulley unit 7 via the rotation transmission shaft 17 to turn the timing belt 8, whereby the slider 3 linearly moves.

Next, advantageous effects of the single axis actuator of the present embodiment will be described with reference to FIGS. 2 and 3.

Figure 3:
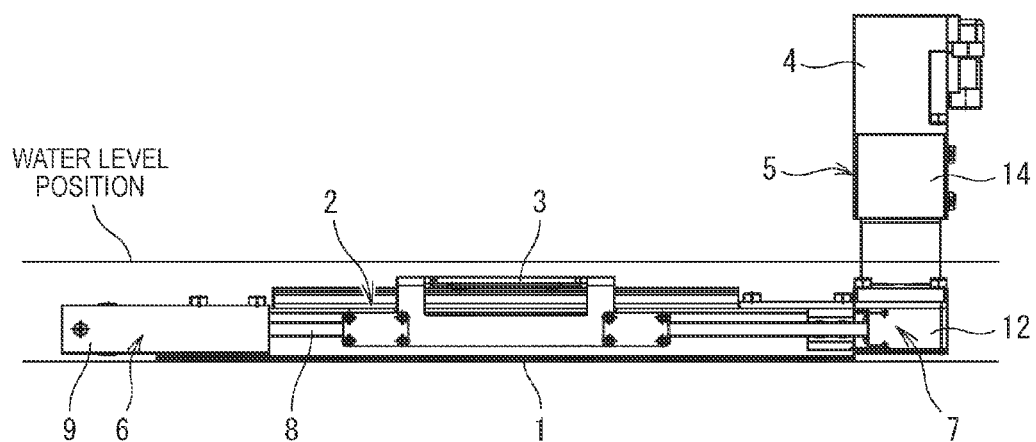
FIG. 3 is a diagram illustrative of a state in which a slider of the single axis actuator of the embodiment according to the invention is submerged in water.

As illustrated in FIG. 3, when the single axis actuator of the present embodiment is placed in a state where the slider 3 is submerged in water, the motor 4 located on an upper portion of the rotation transmission unit 5 is positioned above a water level, so that a waterproof effect can be sufficiently ensured even without providing any specific waterproof structure to the motor 4.

Additionally, the timing belt 8 used in the single axis actuator of the present embodiment is bridged the driven-side timing pulley 11 and the driving-side timing pulley 13 in the state where the width direction of the belt is oriented in the vertical direction and inner belt teeth are extended in the vertical direction. Thus, in use under in-water submerged environment, any foreign substance contained in water hardly gathers between the belt teeth, allowing normal operation of the timing belt mechanism.

In addition, the driven-side timing pulley 11 and the driving-side timing pulley 13 are made of a synthetic resin material having corrosion resistance against moisture, and the device frame 1, the slider 3, the pulley case 9 of the driven-side pulley unit 6, the shaft 10, the pulley case 12 of the driving-side pulley unit 7, the rotation transmission shaft 17, and the housing 14 are made of a metal material having corrosion resistance against moisture, such as stainless steel. Thus, the single axis actuator of the present embodiment has durability even in long-term use under in-water submerged environment.

Furthermore, the waterproof effect is improved only by locating the first to the third liquid-tight sealing members 21, 22, and 23 at points from which water is likely to enter into the motor 4 side in the rotation transmission unit 5, and no influence is exerted on load resistance, moment resistance, and the like of the single axis actuator, so that the single axis actuator of the invention can be used as being of high load specifications.

INDUSTRIAL APPLICABILITY

As described hereinabove, the single axis actuator according to the present embodiment is useful for use as being of high load specifications even in an environment in which the slider is submerged in water.

REFERENCE SIGNS LIST

1: Device frame, 2: Timing belt mechanism, 3: Slider, 4: Motor, 4*a*: Motor shaft, 5: Rotation transmission unit, 6: Driven-side pulley unit, 7: Driving-side pulley unit, 8: Timing belt, 9: Pulley case, 10: Shaft, 11: Driven-side timing pulley, 12: Pulley case, 13: Driving-side timing pulley, 14: Housing, 15, 16: Bearing, 17: Rotation transmission shaft, 18: Coupling member, 20: Slider securing member, 21: First liquid-tight sealing member, 22: Second liquid-tight sealing member, 23: Third liquid-tight sealing member

The invention claimed is:

1. A single axis actuator, comprising
   a driving-side timing pulley located at one end in a longitudinal direction of a device frame in such a manner that a rotational center of the driving-side timing pulley is vertically oriented;
   a rotation transmission shaft coaxially connected to the driving-side timing pulley and extending upwardly;
   a driven-side timing pulley located at another end of the longitudinal direction of the device frame in such a manner that a rotation shaft of the driven-side timing pulley is vertically oriented;
   a timing belt bridged between the driving-side timing pulley and the driven-side timing pulley;
   a slider connected to a part of the timing belt to be made movable in the longitudinal direction of the device frame;
   a motor having a motor shaft which is connected to an upper end of the rotation transmission shaft;
   a cylindrical housing that houses the rotation transmission shaft and the motor shaft and a pulley case that houses the driving-side timing pulley, wherein the rotation transmission shaft passes through a lower opening portion provided at a lower portion of the housing and an upper opening portion provided at an upper portion of the pulley case to be connected to the driving-side timing pulley, and a first liquid-tight sealing member is located on a peripheral edge between the lower opening portion of the housing and the upper opening portion of the pulley case, the lower opening portion and the upper opening portion corresponding to each other.

2. The single axis actuator according to claim 1, wherein the motor is located at an upper portion of the housing, and a second liquid-tight sealing member is located between the motor and a peripheral edge of an upper opening portion of the housing, the motor shaft extending from above the upper opening portion.

3. The single axis actuator according to claim 1, wherein the driving-side timing pulley, the rotation transmission shaft, the driven-side timing pulley, the timing belt, and the slider are made of a material having corrosion resistance against moisture.

4. The single axis actuator according to claim 2, wherein the driving-side timing pulley, the rotation transmission shaft, the driven-side timing pulley, the timing belt, and the slider are made of a material having corrosion resistance against moisture.

* * * * *